United States Patent
Yang et al.

(10) Patent No.: US 9,641,101 B1
(45) Date of Patent: May 2, 2017

(54) METHOD FOR CONTROLLING OUTPUT ENERGY OF A POWER SYSTEM

(71) Applicant: Chicony Power Technology Co., Ltd., New Taipei (TW)

(72) Inventors: Chu-Chen Yang, New Taipei (TW); Chao-Jui Huang, New Taipei (TW)

(73) Assignee: CHICONY POWER TECHNOLOGY CO., LTD., New Taipei (TW)

(*) Notice: Subject to any disclaimer, the term of this patent is extended or adjusted under 35 U.S.C. 154(b) by 43 days.

(21) Appl. No.: 14/884,006

(22) Filed: Oct. 15, 2015

(51) Int. Cl.
*H02M 1/42* (2007.01)
*H02M 7/537* (2006.01)
*G05F 1/70* (2006.01)
*H02M 7/797* (2006.01)

(52) U.S. Cl.
CPC .............. *H02M 7/537* (2013.01); *H02M 1/42* (2013.01); *G05F 1/70* (2013.01); *H02M 7/797* (2013.01)

(58) Field of Classification Search
CPC ... H02M 1/42; G05F 1/70; G05F 1/67; Y02B 70/12; Y02B 70/126
See application file for complete search history.

(56) References Cited

U.S. PATENT DOCUMENTS

| | | | |
|---|---|---|---|
| 2003/0052653 A1* | 3/2003 | Mendenhall | H02M 1/4208 323/210 |
| 2013/0119949 A1* | 5/2013 | Albertson | H01G 9/00 323/209 |

\* cited by examiner

*Primary Examiner* — Harry Behm
(74) *Attorney, Agent, or Firm* — Muncy, Geissler, Olds & Lowe, P.C.

(57) ABSTRACT

A method for controlling output energy of a power system includes following steps: Using a controlling unit to detect a phase offset between voltage and current of an AC power outputted from the power system. When the power system enters an energy-storage cycle, the controlling unit makes a power conversion unit output the AC power having a first preset power factor and store a partial energy of an AC grid in an energy-storage unit when the AC power is in a reactive power area. When the power system enters an energy-release cycle, the controlling unit makes the power conversion unit output the AC power having a second preset power factor and release the energy stored in the energy-storage unit, wherein an average value of the power factor in the energy-storage cycle and the energy-release cycle is the same as a preset average power factor.

6 Claims, 7 Drawing Sheets

METHOD FOR CONTROLLING OUTPUT ENERGY OF A POWER SYSTEM

BACKGROUND OF THE INVENTION

Field of the Invention

The present invention relates to a method for controlling output energy of a power system, and in particular to a method for controlling output energy of a photovoltaic power system.

Description of Related Art

Sunlight is a well-known renewable energy source, and solar cells, as widely known, are designed to absorb sunlight and generate electric power. Typically, a solar energy system includes a plurality of solar cells disposed in an array or panel and a photovoltaic (PV) inverter connected to the solar cells to invert direct current (DC) power derived from the solar cells into alternative current (AC) power for connection to the utility.

In general, the solar energy system including solar cells and PV inverter mentioned above further includes a reactive power compensation device for improving power quality by controlling the reactive power and keeping the power factor as close to unity as possible.

However, the reactive power compensation device cause an overvoltage condition since the voltage inputted to the solar energy system is raised. Therefore it is desirable to use an energy recycle device to suppress overvoltage condition. The solar energy system includes the reactive power compensation device and energy recycle device, however, is bulky and the circuit thereof is complex.

SUMMARY OF THE INVENTION

According to one aspect of the present disclosure is to provide a method for controlling output energy of a power system that can improve overall efficiency of the power system.

Accordingly, the method for controlling output energy of a power system is applied to feed an alternative current (AC) power to an AC grid. The method comprises following steps. First, a phase offset between an AC voltage and an AC current of the AC power outputted from a power conversion unit of the power system is detected by a controlling unit, wherein the controlling unit has a first preset power factor, a second preset power factor, and a preset average power factor. After that, the controlling unit makes the power conversion unit output the AC power having the first preset power factor to the AC grid when the power system enters an energy-storage cycle. The controlling unit further makes the power conversion unit store a partial energy of the AC grid in the energy-storage unit when in a reactive power area of the AC power having the first preset power factor. Besides, the controlling unit makes the power conversion unit output the AC power having the second preset power factor and release the energy stored in the energy-storage unit when the power system enters the energy-release cycle, wherein the released energy and AC power outputted from the power conversion unit are fed to the AC grid. In particular, an average value of a power factor in the energy-storage cycle and the energy-release cycle is the same as the average power factor.

In the present disclosure, the reactive power area where the AC voltage and the AC current are out of phase, the first preset power factor is lower than the preset average power factor, and the second preset power factor is higher than the preset average power factor.

Besides, the controlling unit may make the power system enter the energy-release cycle when the energy stored in the energy-storage unit and detected thereby is higher than a first preset value, and the controlling unit may makes the power system enters the energy-storage cycle when the energy stored in the energy-storage unit and detected thereby is not higher than a second preset value, wherein the period of the energy-storage cycle is different from that of the energy-release cycle.

The method of the present invention employed controlling unit to make the power conversion unit output the AC power having the first preset power factor when entering the energy-storage cycle. The controlling unit 140 further makes a partial energy of the AC grid feed to the power system when the AC power having the first power factor is in the reactive power area of the energy-storage cycle. The controlling unit 140 further makes the power system 1 output the AC power having the second preset power factor and release the energy stored in the energy-storage unit 12 when entering the energy-release cycle, wherein the energy released by the energy-storage unit is inverted into AC power and feed to the AC grid.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
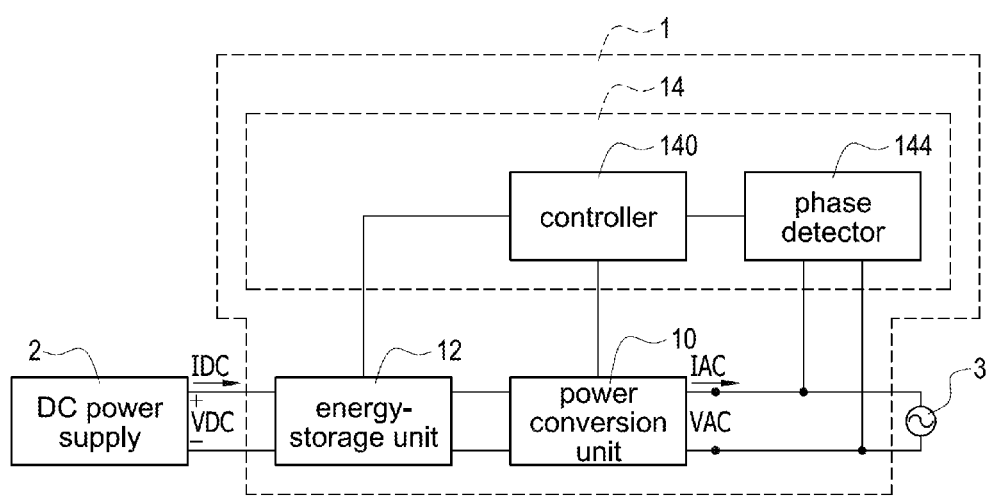
FIG. 1 is a circuit block diagram of a power system according to a first embodiment of the present invention.

Reference is made to FIG. 1, which is a circuit block diagram of a power system according to a first embodiment of the present invention. The power system 1 is arranged between a direct current (DC) power supply 2 and an alternative current (AC) grid 3. The DC power supply 2 is, for example, a solar cell module, and is configured to generate a DC power (including DC voltage VDC and DC current IDC) and feed the DC power to the power system 1. The power system 1 is configured to invert the DC power into an AC power (including AC voltage and AC current) and feed the AC power to the AC grid 3. The power system 1 includes a power conversion unit 10, an energy-storage unit 12, and a controlling unit 14.

The power conversion unit 10 is, for example, a photovoltaic inverter. The energy-storage unit 12 is arranged between the DC power supply 2 and the power conversion unit 10, and is electrically connected to the DC power supply 2 and the power conversion unit 10. In particular, the energy-storage unit 12 is electrically connected to the DC power supply 2 in parallel.

The controlling unit 14 is electrically connected to the power conversion unit 10 and the energy-storage unit 12. The controlling unit 14 includes a first preset power factor, a second preset power factor, and a preset average power factor, the first preset power factor is lower than the preset average power factor, and the second preset power factor is higher than the preset average power factor.

The controlling unit 14 is not only configured to detect the energy stored in the energy-storage unit 12, but also detect the phase offset between the AC voltage VAC and AC current IAC of the AC power outputted from the power conversion unit 10. The controlling unit 14 includes a controller 140 and a phase detector 144. The controller 140 is electrically connected to the power conversion unit 10, an energy-storage unit 12, and the phase detector 144. The phase detector 144 is configured to detect the phase offset between the AC voltage VAC and AC current IAC of the AC power outputted from the power conversion unit 10. In the practical application, however, the phase detector 144 can be omitted, and the controller 140 is configured to detect the AC voltage VAC and the AC current IAC and then calculate the phase offset between the AC voltage VAC and the AC current IAC of the AC power outputted from the power conversion unit 10.

Figure 2:
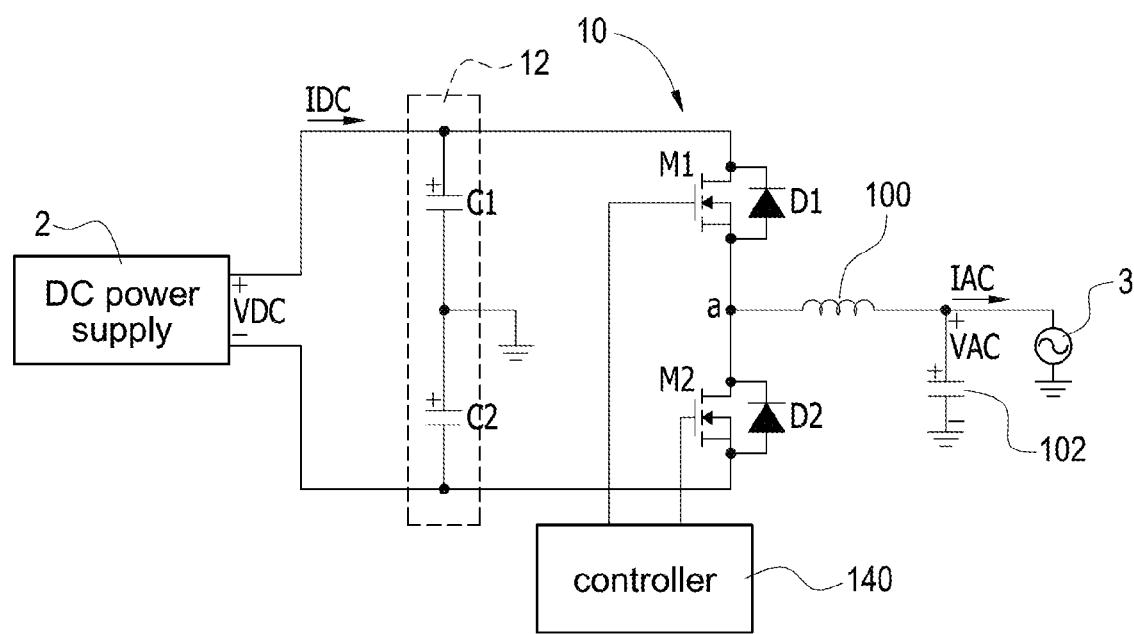
FIG. 2 is a circuit diagram illustrating an energy-storage unit and a power conversion unit according to the first embodiment of the present invention.

Reference is made to FIG. 2, which is a circuit diagram of the energy-storage unit and the power conversion unit according to the first embodiment of the present invention. For sake of convenient explanation, FIG. 2 also illustrates the DC power supply 2, the AC grid 3, and the controller 140. The power conversion unit 10 includes switches M1 and M2, an energy-storage component 100, diodes D1 and D2, and output filter 102. The switches M1 and M2 electrically connected in series is electrically connected to the DC power supply 2 in parallel, and the energy-storage component 100 is electrically connected to a node a between source of the switch M1 and drain of the switch M2. In this embodiment, the switches M1 and M2 are metal-oxide-semiconductor field-effect transistors (MOSFETs), and the energy-storage component 100 is an inductor. In particular, the source of the switch M1 is connected to the drain of the switch M2, the drain of the switch M1 and the source of the switch M2 are connected to two opposite terminals the energy-storage unit 12, and the gates of the switches M1 and M2 are connected to the controller 140. The diode D1 is electrically connected to the switch M1 in parallel, and the diode D2 is electrically connected to the switch M2 in parallel. In particular, the cathode of the diode D1 is connected to the drain of the switch M1, and the anode thereof is connected to the source of the switch M1; the cathode of the diode D2 is connected to the drain of the switch M2, and the anode thereof is connected to the source of the switch M2. The output filter 102 is arranged between the energy-storage component 100 and the AC grid 3 and electrically connected thereto.

The energy-storage unit 12 includes capacitors C1 and C2 electrically connected in series, and the capacitors C1 and C2 in series connection is electrically connected to the switches M1 and M2 in series connection in parallel.

Referred is made to FIG. 1 and FIG. 2, when the power system 1 is activate, the controller 140 of the controlling unit 14 manages the duty cycle for controlling each of the switches M1 and M2, hence, the AC power outputted from the power system 1 is selected between the first preset power factor and the second preset power factor.

The controller 140 of the controlling unit 14 further detects the energy stored in the energy-storage unit 12, and the phase detector 140 of the controlling unit 14 detects the phase offset between the AC voltage VAC and the AC current IAC. The power system 1 can be designed to enter an energy-release cycle while the energy stored in the energy-storage unit 12 is higher than a first preset value, and to enter an energy-storage cycle while the energy stored in the energy-storage unit 12 is not higher than the first preset value. The power system 1 can also be designed to enter the energy-storage cycle while the energy stored in the energy-storage unit 12 is not higher than a second preset value, and to enter the energy-release cycle while the energy stored in the energy-storage unit 12 is higher than the second preset value, and the first preset value can be higher than the second preset value.

In the energy-storage cycle (as the t1 period shown in the FIG. 3 and FIG. 4), the controlling unit 14 makes the power conversion unit 10 output the AC power having the first preset power factor. Besides, when the AC power is in a reactive power area where the AC voltage VAC and AC current IAC are out of phase (as the A1 segment shown in FIG. 3 and FIG. 4), the controlling unit 14 makes the voltage level at the node a be lower than the instantaneous voltage level of the AC grid 3 by managing the duty cycles of the switches M1 and M2. As such, a partial energy of the AC grid 3 is fed to the power system 1 and stored in the energy-storage unit 12. The voltage level of the node a is given by $$V_a = D1 \times V_{C1} + D2 \times V_{C2};$$

where

D1 is the duty cycle of the switch M1;
D2 is the duty cycle of the switch M2;
VC1 is the voltage of the capacitor C1; and
VC2 is the voltage of the capacitor C2.

In the energy-release cycle (as the t2 period shown in the FIG. 3 and FIG. 4), the controlling unit 14 makes the power conversion unit 10 output the AC power having the second preset power factor and manages the duty cycles of the switches M1 and M2 to make the voltage level at the node a be higher than the instantaneous voltage level of the AC grid 3. As such, the energy stored in the energy-storage unit 12 is released, and the energy released by the energy-storage unit 12 and the DC power provided by the DC power supply 2 are inverted into AC power and fed to the AC grid 3 together.

Figure 3:
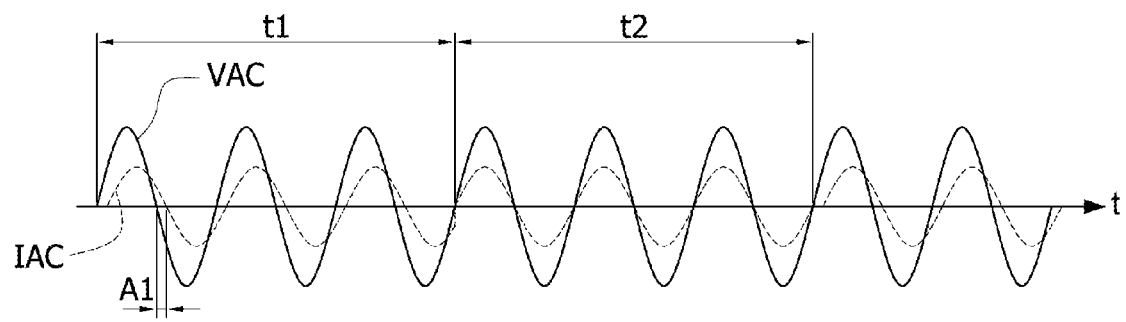
FIG. 3 is a waveform chart illustrating an AC power outputted from the power system.
Figure 4:
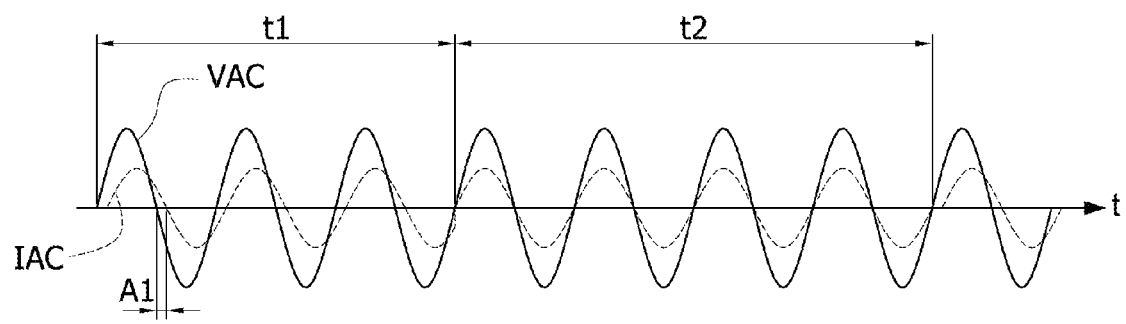
FIG. 4 is another waveform chart illustrating an AC power outputted from the power system.

In FIG. 3, the period of the energy-storage cycle is the same as that of the energy-release cycle. However, in FIG. 4, the period of the energy-storage cycle is different from that of the energy-release cycle. Whether the period of the energy-storage cycle is the same as that of the energy-release cycle or not, an average value of the power factor in the energy-storage cycle and the energy-release cycle is the same as the preset average power factor.

Figure 5:
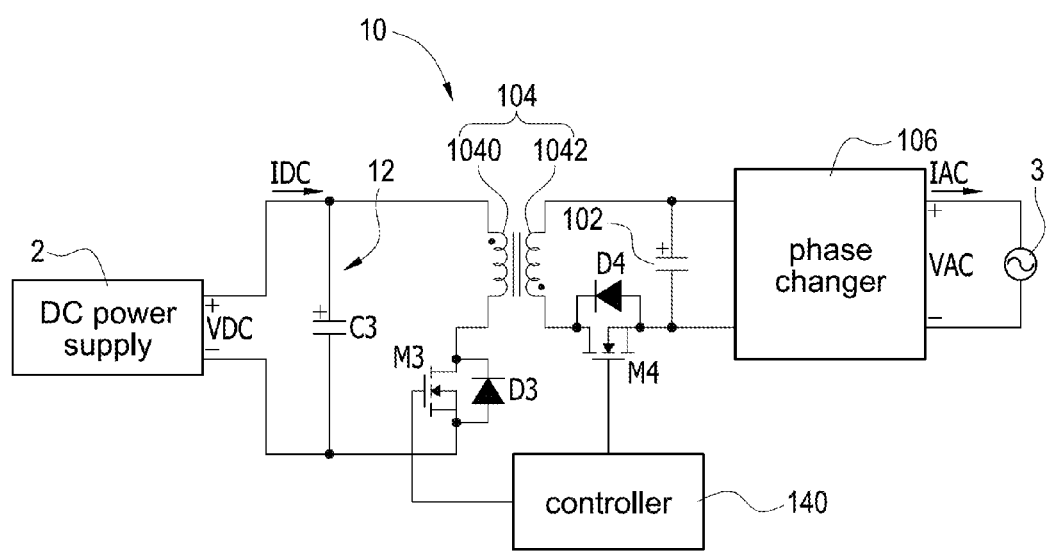
FIG. 5 is a circuit diagram illustrating an energy-storage unit and a power conversion unit according to a second embodiment of the present invention.

Reference is made to FIG. 5, which is a circuit diagram of the energy-storage unit and the power conversion unit according to a second embodiment of the present invention. For sake of convenient explanation, FIG. 5 also illustrates the DC power supply 2, the AC grid 3, and the controller 140. The energy-storage unit 12 includes a capacitor C3 electrically connected to the DC power supply 2 in parallel. The power conversion unit 10 includes switches M3 and M4, diodes D3 and D4, output filter 102, an energy-storage component 104, and a phase changer 106, and the output filter 102 is electrically connected to the phase changer 106 in parallel.

The switches M3 and M4 are MOSFETs, and the energy-storage component 104 is an isolating transistor including a primary winding 1040 and a secondary winding 1042 coupled to each other. One terminal of the primary winding 1040 is connected to the energy-storage unit 12, and the other terminal thereof is electrically connected to the drain of the switch M3 and the cathode of the diode D3. The gate of the switch M3 is electrically connected to the controller 140, and the source thereof is electrically connected to the energy-storage unit 12 and the anode of the diode D3. One terminal of the secondary winding 1042 is electrically connected to the output filter 102, and the other terminal thereof is electrically connected to the drain of the switch M4 and the cathode of the diode D4. The gate of the switch M4 is electrically connected to the controller 140, and the source thereof is electrically connected to the output filter 102.

Referred is made to FIG. 1 and FIG. 5, when the power system 1 is activate, the controller 140 of the controlling unit 14 manages the duty cycle for controlling each of the switches M3 and M4, hence, the AC power outputted from the power system 1 is selected between the first preset power factor and the second preset power factor.

The controller 140 of the controlling unit 14 further detects the energy stored in the energy-storage unit 12, and the phase detector 144 of the controlling unit 14 detects the phase offset between the AC voltage VAC and the AC current IAC. The power system 1 can be designed to enter an energy-release cycle while the energy stored in the energy-storage unit 12 is higher than a first preset value, and to enter an energy-storage cycle while the energy stored in the energy-storage unit 12 is not higher than the first preset value. The power system 1 can also be designed to enter the energy-storage cycle while the energy stored in the energy-storage unit 12 is not higher than a second preset value, and to enter the energy-release cycle while the energy stored in the energy-storage unit 12 is higher than the second preset value, wherein the first preset value can be higher than the second preset value.

In the energy-storage cycle (as the t1 period shown in FIG. 3 and FIG. 4), the controlling unit 14 makes the power conversion unit 10 output the AC power having the first preset power factor. Besides, when the AC power having the first preset power factor is in the reactive power area where the AC voltage VAC and the AC current IAC are out of phase (as the A1 segment shown in FIG. 3 and FIG. 4), the controlling unit 14 makes the switch M4 turn on (close) and the switch M3 turn off (open), thus a partial energy of the AC grid 3 is fed to the power system 1 and stored in the secondary winding 1042. When the switch M3 is turned on and the switch M4 is turned off, the energy stored in the secondary winding 1042 during the time when the switch M3 is turned off and the switch M4 is turn on is thus transmitted to the energy-storage unit 12 and stored in the energy-storage unit 12.

In the energy-release cycle (as the t2 period shown in FIG. 3 and FIG. 4), the controlling unit 14 makes the power conversion unit 10 output the AC power having the second preset power factor. The controller unit 14 further makes the switch M3 turn on and the switch M4 turn off, thus the energy stored in the energy-storage unit 12 is transmitted to the primary winding 1040 and stores in the energy-storage unit 104. After that, the controlling unit 14 makes the switch M3 turn off and the switch M4 turn on, thus the energy stored in the energy-storage unit 12 in the energy-storage cycle and the AC power converted by the DC power are fed to the AC grid 3. It should be noted that an average value of the power factor in the energy-storage cycle and the energy-release cycle is equal to the average preset power factor.

In sum, when the power system 1 of the present invention enters the energy-storage cycle, the controlling unit 14 makes the power conversion unit 10 output the AC power having the first preset power factor. The controlling unit 140 further makes a partial energy of the AC grid 3 feed to the power system 1 when the AC power having the first power factor is in the reactive power area. When the power system 1 enters the energy-release cycle, the controlling unit 140 makes the power system 1 output the AC power having the second preset power factor, the controlling unit 14 further makes the power conversion unit 10 to release the energy stored in the energy-storage unit 12, hence the energy released by the energy-storage unit 12 and the DC power provided by the DC power supply 2 are inverted into AC power and fed to the AC grid 3 together, wherein the AC power fed to the AC grid 3 has the second preset power factor.

Figure 6:
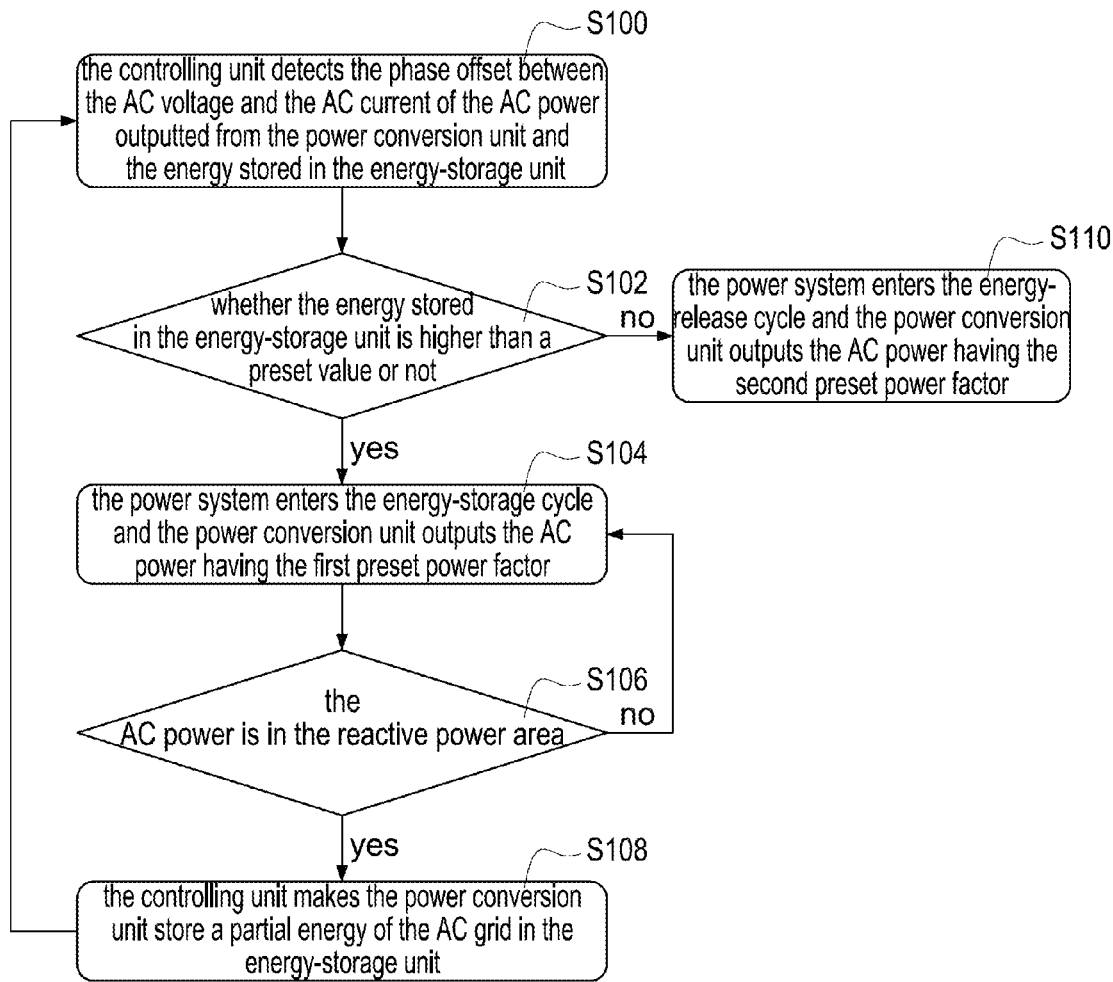
FIG. 6 is a flow diagram of a method for controlling energy of the power system according to a first embodiment of the present invention.
Figure 7:
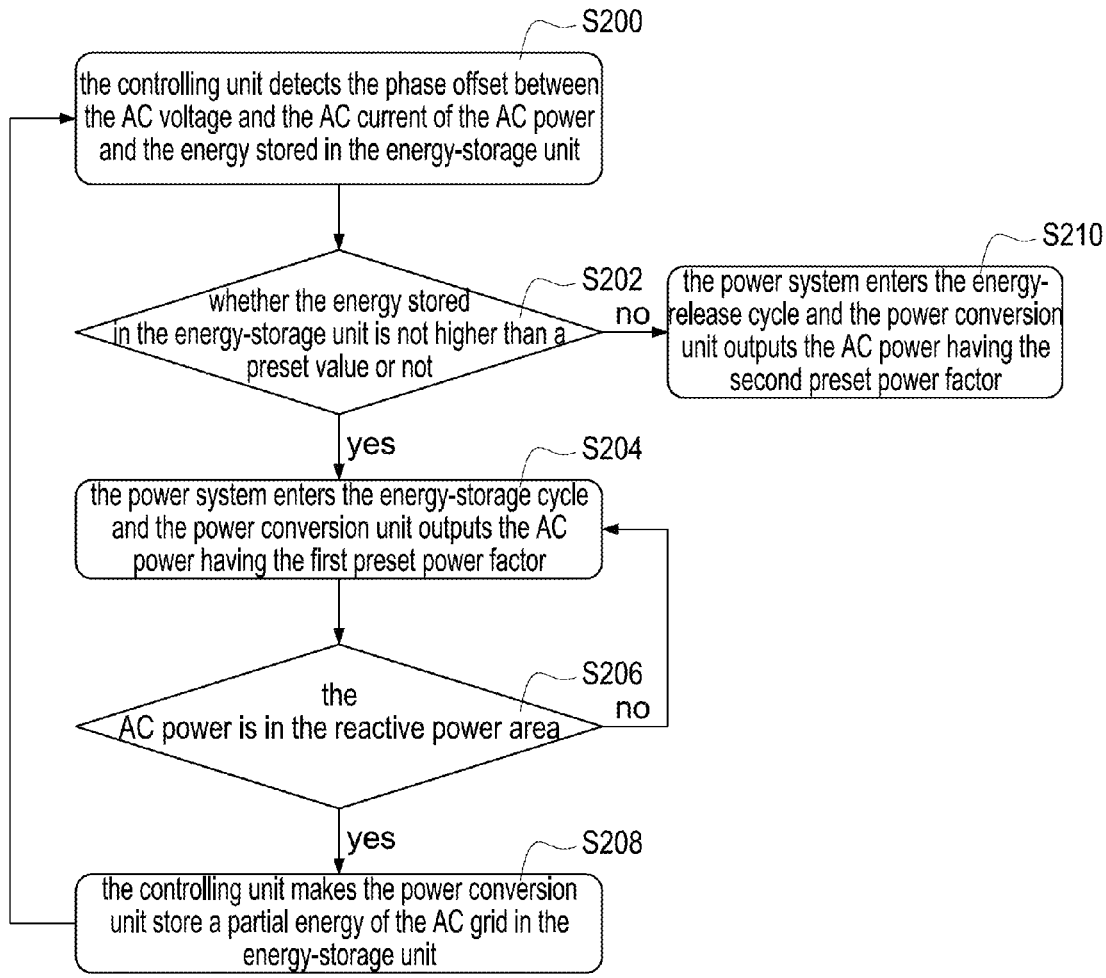
FIG. 7 is a flow diagram of a method for controlling energy of the power system according to a second embodiment of the present invention.

Reference is made to FIG. 6 and FIG. 7, wherein FIG. 6 is a flow diagram of a method for controlling energy of a power system according to the first embodiment of the present invention, and FIG. 7 is another flow diagram of a method for controlling energy of the power system according to the second embodiment of the present invention. It should be noted that the flow diagram shown in FIG. 6 is similar to that shown in FIG. 7, and the difference between FIG. 6 and FIG. 7 is that threshold for determining the energy-storage cycle and the energy-release cycle.

In FIG. 6, the controlling unit 14 detects the phase offset between the AC voltage VAC and AC current IAC of the AC power outputted from power system 1 and detects the energy stored in the energy-storage unit 12 (step S100) at first. Then, the controlling unit 140 determines whether the energy stored in the energy-storage unit 12 is higher than a first preset value or not (step 102). If the energy stored in the energy-storage unit 12 is not higher than the first preset value, the power system 1 enters energy-storage cycle and outputs the AC power having first preset power factor (step S104). The controlling unit 140 further determines whether the AC power outputted from the power system 1 is in the reactive power area or not (step S106), and if the AC power outputted from the power system 1 is in the reactive power area, a step S108 is performed, where the controlling unit 14 makes a partial energy of the AC grid 3 feed to the power system 1 and store in the energy-storage unit 12 (step S108); otherwise the method back to step S104 After step S108, the method returns back to step S100 to detect the phase offset between the AC voltage VAC and AC current IAC of the AC power outputted from the power system 1 and detect the energy stored in the energy-storage unit 12, and if the energy stored in the energy-storage unit 12 is met or higher than the first preset value, the power system 1 enters the energy-release cycle, and the power conversion unit 10 outputs AC power having the second preset power factor (step S110).

In FIG. 7, the controlling unit 14 detects the phase offset between the AC voltage VAC and AC current IAC of the AC power outputted from power system 1 and detects the energy stored in the energy-storage unit 12 (step S200). The controlling unit 140 then determines whether the energy stored in the energy-storage unit 12 is not higher than a second preset value or not (step 202). If the energy stored in the energy-storage unit 12 is not higher than the second preset value, the power system 1 enters the energy-storage cycle and outputs the AC power having the first preset power factor (step S204). The controlling unit 140 further determines whether the AC power outputted from the power system 1 is in the reactive power area or not (step S206), and if the AC power outputted from the power system 1 is in the reactive power area, a step S208 is performed, where the controlling unit 14 makes a partial energy of the AC grid 3 store in the energy-storage unit 12 (step S208); otherwise the method back to step S204 After step S208, the method returns back to step S200 to detect the phase offset between the AC voltage VAC and AC current IAC of the AC power outputted from the power system 1 and detect the energy stored in the energy-storage unit 12, and if the energy stored in the energy-storage unit 12 is met or higher than the second preset value, the power system 1 enters energy-release cycle, and the power conversion unit 10 outputs AC power having the second preset power factor (step S210).

Figure 8:
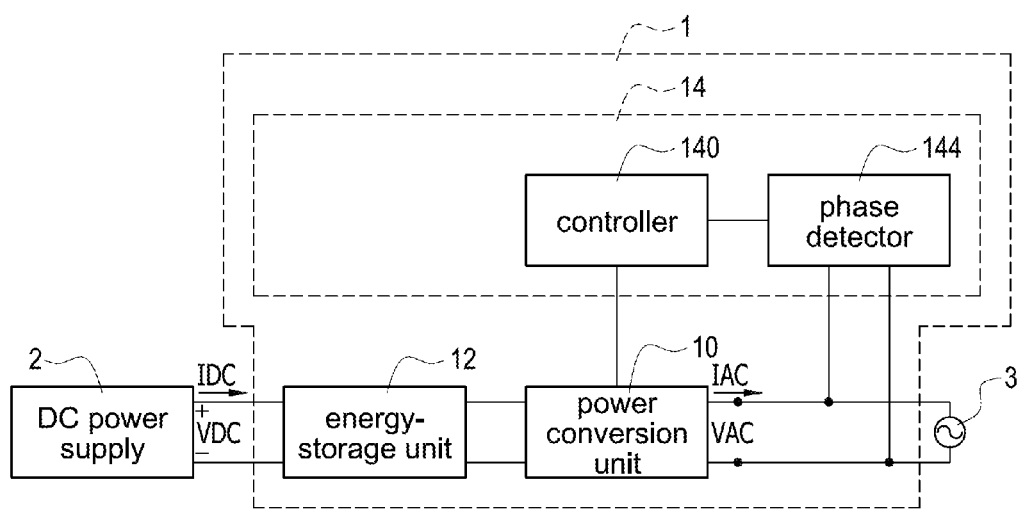
FIG. 8 is a circuit block diagram of a power system according to a second embodiment of the present invention.

Reference is made to FIG. 8, which is a circuit block diagram of a power system according to a second embodiment of the present invention. In FIG. 8, the power system 1 is arranged between a DC power supply 2 and an AC grid 3 and electrically connected thereto for outputting an AC power having an average power factor. The power system 1 shown in FIG. 8 is similar to that shown in FIG. 1. The difference between the power system 1 shown in FIG. 1 and FIG. 8 is that the controlling unit 14 shown in the FIG. 8 cannot detect the energy stored in the energy-storage unit; however, the controlling unit 14 generates a disturbance signal with preset period to disturb the AC power outputted from the power system 1 by an open-loop command, and the power system 1 enters the energy-storage cycle and the energy-release cycle according to the disturbance signal.

The power system 1 includes a power conversion unit 10, an energy-storage unit 12, and a controlling unit 14. The power conversion unit 10 is electrically connected to the AC grid 3 for outputting an AC power having a first preset power factor or a second preset power factor. The energy-storage unit 12 is arranged between the DC power supply 2 and the power conversion unit 10 and electrically connected thereto.

The controlling unit 14 is electrically connected to the power conversion unit 10 and has the first preset power factor, the second preset power factor, and an preset average power factor, wherein the first preset power factor is lower than the preset average power factor, and the second preset power factor is higher than the preset average power factor.

The power conversion unit 10 can be managed between an energy-storage cycle and an energy-release cycle, and an average value of the power factor in the energy-storage cycle and the energy-release cycle is the same as the preset average power factor.

When the power system 1 enters the energy-storage cycle, the controlling unit 14 makes the power system 1 output the AC power having the first preset power factor. Besides, when the AC power is in a reactive power area, the controlling unit 14 makes a partial energy of the AC grid 3 enter the power system 1 and store in the energy-storage unit 12.

When the power system 1 enters the energy-release cycle, the controlling unit 14 makes the power conversion unit 10 output the AC power having the second preset power factor. The controlling unit 14 further makes the energy-storage unit 12 release the energy stored in the energy-storage cycle mentioned above, and the released energy is then converted by the power conversion unit 10 and fed to the AC grid (3) with the AC power converted by the DC power provided by the DC power supply 2. As such, the AC power outputted from the power system 1 in the energy-release cycle is provided not only by the DC power supply, but also the energy released by energy-storage unit 12.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A method for controlling power output energy of a power system (1) applied to feed an alternative current (AC) power to an AC grid (3), the method comprising:
   detecting a phase offset between an AC voltage and an AC current of the AC power outputted from a power conversion unit (10) of the power system (1) by a controlling unit (14), wherein the controlling unit (14) has a first preset power factor, a second preset power factor, and a preset average power factor;
   when entering an energy-storage cycle, the controlling unit (14) making the power conversion unit (10) output the AC power having the first preset power factor to the AC grid (3) and store a partial energy of the AC grid (3) in an energy-storage unit (12) when in a reactive power area of the AC power having the first preset power factor;
   when entering energy-release cycle, the controlling unit (14) making the power conversion unit (10) output the AC power having the second preset power factor and release the energy stored in the energy-storage unit (12), wherein the released energy and the AC power outputted from the power conversion unit (12) are fed to the AC grid (3);
   wherein an average value of a power factor in the energy-storage cycle and the energy-release cycle is the same as the average power factor.

2. The method of claim 1, further comprising:
   entering the energy-release cycle when the energy stored in the energy-storage unit (12) and detected by the controlling unit (14) is higher than a first preset value.

3. The method of claim 1, further comprising:
   entering the energy-storage cycle when the energy stored in the energy-storage unit (12) and detected by the controlling unit (14) is not higher than a second preset value.

4. The method of claim 1, wherein the reactive power area is an area where the AC voltage and the AC current are out of phase.

5. The method of claim 1, wherein a period of the energy-storage cycle is different from a period of the energy-release cycle.

6. The method of claim 1, wherein the first preset power factor is lower than the preset average power factor, and the second preset power factor is higher than the preset average power factor.

\* \* \* \* \*